United States Patent [19]

Naganuma et al.

[11] Patent Number: 5,241,677
[45] Date of Patent: Aug. 31, 1993

[54] MULTIPROCESSOR SYSTEM AND A METHOD OF LOAD BALANCING THEREOF

[75] Inventors: Jiro Naganuma, Zama; Takeshi Ogura, Chigasaki, both of Japan

[73] Assignee: Nippon Telepgraph and Telehone Corporation, Tokyo, Japan

[21] Appl. No.: 710,280

[22] Filed: Jul. 10, 1991

Related U.S. Application Data

[62] Division of Ser. No. 522,504, May 11, 1990, Pat. No. 5,053,950.

[30] Foreign Application Priority Data

Dec. 19, 1986 [JP] Japan .............................. 61-303412
May 25, 1987 [JP] Japan .............................. 62-127338

[51] Int. Cl.⁵ .............................................. G06F 15/16
[52] U.S. Cl. ..................................... 395/650; 395/700; 395/375; 364/DIG. 1; 364/281.3; 364/281; 364/284; 364/282.1; 364/283.2; 364/229.41; 364/975.5; 364/977
[58] Field of Search ......................... 395/650, 700, 375

[56] References Cited

U.S. PATENT DOCUMENTS

| | | | |
|---|---|---|---|
| 3,348,210 | 10/1967 | Ochsner | 364/200 |
| 3,496,551 | 2/1970 | Driscoll et al. | 364/200 |
| 3,593,300 | 7/1971 | Driscoll, Jr. | 364/200 |
| 4,073,005 | 2/1978 | Parkin | 364/200 |
| 4,099,235 | 7/1978 | Höschler et al. | 364/200 |
| 4,130,865 | 12/1978 | Heart et al. | 364/200 |
| 4,318,173 | 3/1982 | Freedman et al. | 364/200 |
| 4,403,286 | 9/1983 | Fry et al. | 364/200 |
| 4,633,387 | 12/1986 | Hartung et al. | 364/200 |
| 4,748,558 | 5/1988 | Hirosawa et al. | 364/200 |
| 4,868,818 | 9/1989 | Madan et al. | 371/11.3 |
| 4,918,595 | 4/1990 | Kahn et al. | 364/200 |
| 5,115,505 | 5/1992 | Bishop et al. | 395/650 |

FOREIGN PATENT DOCUMENTS

| | | |
|---|---|---|
| 0223463 | 5/1987 | European Pat. Off. |
| 1481609 | 8/1977 | United Kingdom |

OTHER PUBLICATIONS

IBM Tech. Discl. Bull. vol. 20, No. 3, Aug. 1977, "Load Balancing Control for Multiprocessors", written by Baker et al, pp. 937 and 938.

Proceedings of the 1986 International Conference on Parallel Processing, Aug. 19-22, 1986. pp. 528-535; P. Tang and P. Yew: "Processor Self-Scheduling for Multiple-Nested Parallel Loops".

Proceedings of the 1986 International Conference on Parallel Processing, Aug. 19-22, 1986, pp. 1010-1012; E. Dekel and S. Peng: "Optimal Parallel Algorithms for Constructing A Balanced M-Way Search Tree".

*Primary Examiner*—Eddie P. Chan
*Attorney, Agent, or Firm*—Darby & Darby

[57] ABSTRACT

A multiprocessor system has a plurality of processors and a network system linking said processors to thereby process a given load written by a logic programming language. According to an initial load balancing algorithm, each processor independently and dynamically selects an initial load segment thereof from the given load by use of a system information representative of characters of the multiprocessor system without transferring information between the processors, whereby an initial load balancing is obtained in the multiprocessor system. According to a load balancing algorithm for reproducing working environments which is performed after performing the initial load balancing algorithm, a partial load segment of a first processor is shared to a second processor. In this case, the first processor generates a history information representative of the working environment thereof, but the amount of the history information is smaller than that of the whole working environment of the first processor. This history information is supplied to the second processor wherein the working environment of the first processor is reproduced by use of the history information. Thereafter, the second processor processes the partial load segment of the first processor by use of the reproduced working environment of the first processor while the first processor processes the load segment thereof. Thus, the present multiprocessor system can reduce the amount of the transferring information remarkably less than that of the conventional multiprocessor system, whereby the load balancing can be performed with a high speed.

5 Claims, 8 Drawing Sheets

MULTIPROCESSOR SYSTEM AND A METHOD OF LOAD BALANCING THEREOF

This is a division of application Ser. No. 522,504, filed May 11, 1990 now U.S. Pat. No. 5,053,950.

BACKGROUND OF THE INVENTION

1. Field of the Invention

The present invention generally relates to a multiprocessor system and a method of load balancing thereof, and more particularly to a multiprocessor system which has a plurality of processors and a network system and a method of load balancing processing in the multiprocessor system in which a given computational task or load is divided into a plurality of load segments and each of the load segments is dynamically assigned to a predetermined processor while the multiprocessor system operates.

2. Prior Art

The conventional multiprocessor system has a plurality of processors and a network system. In the case where a given computational task or load written in a logic programming Language (e.g., Prolog) is executed in parallel in the conventional multiprocessor system, the given load (or an initial goal) is divided into plural initial load segments which are assigned to all of the processors at an initial load balancing stage. More specifically, a first initial load segment is given to a first processor wherein data representative of the processing result of the first initial load segment is obtained, and such data must be transferred to a second processor which starts to process a second initial load segment thereof by use of such data. Thus, data representative of the processing result in the presently operating first processor must be transferred to the next processor, which is idle during the operation of the first processor, but will start to process its initial load segment by use of the data from the first processor. As described heretofore, the initial load segments are sequentially assigned to the processors in turn. Hence, the conventional multiprocessor system requires a long processing time before the given load is executed in parallel.

At a time when the initial goal is given to one processor, all of the other idle processors within the multiprocessor system do not operate. Hence, one processor must divide the given initial goal into plural initial load segments which must be assigned to the other processors. In addition, the conventional multiprocessor system must provide the network system for transferring information concerning the given initial goal which must be divided. For this reason, the conventional multiprocessor system cannot perform an initial load balancing of the initial goal with high speed. Originally, it is possible to obtain a performance improvement due to a parallel effect for shortening processing times (hereinafter, simply referred to as the parallel effect) when the given load is executed in parallel in the conventional multiprocessor system. However, the conventional multiprocessor system suffers from a problem in that it is not actually possible to obtain such parallel effect because of the reason described above.

Further, the above mentioned one processor supplied with the initial goal must transfer a certain part of the information thereof to all of other processors so that the amount of information to be transferred is increased. Hence, the conventional multiprocessor system suffers another problem in that it must have the ability to transfer data at high speed and transfer a large quantity of data for the network system.

Next, a description will be given with respect to the above-mentioned problems in detail by considering that the logic programming language (i.e., Prolog) is executed in the conventional multiprocessor system.

In a process for sequentially executing Prolog (shown in FIG. 2), a predetermined priority (i.e., a depth-first-search) is given such that branches are searched from an upper side to a lower side and from a left side to a right side within an inference tree (or a proof tree) of Prolog. When the system fails to find the correct branch (or the desirable branch) while searching, the system backtracks to the preceding node and searches all branches connected thereto so as to find the correct branch.

In another process for executing Prolog in parallel, plural processors simultaneously search a certain section or all sections of the inference tree so as to find the correct branches in accordance with a predetermined breadth-first-search. Such a process is called an OR parallel execution in which all branches within the inference tree are divided into plural sections (hereinafter, referred to as OR processes) each having a certain number of the branches and all of the OR processes are respectively assigned to the idle processors when the initial goal is given to the system. In this case, information required to execute each OR process must be transferred to the corresponding idle processor.

As described before, one processor supplied with the initial goal must divide the given initial goal into plural initial load segments which must be assigned to the other idle processors at the initial load balancing stage. Hence, the conventional system can not perform the initial load balancing with high speed.

Meanwhile, after the load balancing is performed between the first and second processors within the multiprocessor system, it is desirable that the first and second processors be able to independently proceed with their respective processes without transferring data representative of the working environment of the first processor from that processor to the second processor.

In order to realize the above-mentioned load balancing within the conventional multiprocessor system, a predetermined working environment required for the second processor must be extracted (or selected) from the working environments which are obtained by performing predetermined processes within the first processor, before performing the load balancing in the first processor, and such predetermined working environment must be transferred to the second processor.

In other words, the above predetermined working environment is identical to the information which is obtained by performing predetermined processes other than the load balancing process within the first processor. Such a predetermined working environment is necessary for the second processor in the case where a certain part of the load to be executed in the first processor is shared with and executed by the second processor. In addition, the amount of information representative of the working environments increases as the system proceeds to balance the load. Therefore, quite a large amount of information must be transferred to the other processors when the load balancing is performed after a long process is performed in each processor.

As described heretofore, the first processor must stop performing its original process and extract the predetermined working environment required for the load balancing from its working environments (at a load generation stage), and then such predetermined working environment, which has a large amount of information, must be transferred to the second processor. Thereafter, the second processor must store the transferred information (at a load storing stage) so it can proceed with its original process. Specifically, a data conversion is required in order to transfer such information by use of the network system. In the present specification, the meaning of the data conversion will be considered to be included in the meanings of the above load generation and load storing.

As shown in FIG. 1, overhead time must inevitably be provided for with the above-mentioned load balancing in the conventional multiprocessor system. In FIG. 1, the first processor cannot prevent a first overhead time from occurring, and the second processor also cannot prevent a second overhead time from occurring.

Due to the overhead time accompanying the load balancing (or due to the stopping of the process in the first processor in particular), each processor can not demonstrate its processing ability by every time unit. In addition, the load balancing is required to be performed between processors at an arbitrary and asynchronous time. Hence, the conventional multiprocessor system suffers from the problem in that it is not possible to demonstrate the parallel effect as described before. This parallel effect can be evaluated by the total ability which can be obtained from the following formula: (Total Ability)=(Processing Ability of each processor)×(Number of processors which are operable in parallel in order to process the given load). Hence, the conventional system needs a network system having a high cost to transfer the large amount of information with arbitrary and asynchronous timing. In order to transfer the large amount of information, the network system must be occupied for a long time, hence, it becomes impossible to perform the load balancing between the processors properly. Therefore, the conventional system stiffers a problem in that a load unbalancing must occur.

Compared to an improvement in the processing speed of the processor, an improvement in the transfer speed of the network system within the multiprocessor system has relatively little effect. This results in a tendency to increase the communication time of the network system more than that of the processors. In this case, the above-mentioned problem becomes serious. As the number of processors within the multiprocessor system increases, such a tendency becomes rather remarkable.

Next, a description will be given with respect to the above-mentioned problem in conjunction with FIG. 2 when Prolog is executed in parallel in the multiprocessor system.

In the case where the first processor performs the load balancing on the second processor in the OR parallel execution described before, the first processor divides an OR process from all branches of the inference tree, and the divided OR process is assigned to the second processor.

In this case, transfer data (to be transferred from the first processor to the second processor) can be classified as first and second transfer data. The first transfer data represent the information of the divided OR process. The second transfer data represent the information of the divided OR process and other information which is required to execute the divided OR process.

The first processor must transfer the above second transfer data to the second processor while the first and second processors independently proceed with their respective processes after the load balancing is performed. This happens because the second processor must refer to the working environment of the first processor when the first processor transfers the first transfer data to the second processor, instead of the second transfer data.

However, the second transfer data must include data representative of the large amount of information of the working environment of the first processor which is necessary for executing the divided OR process. This working environment in the Prolog execution includes "bind information" representative of a connection relation between variables and values and "control information" for controlling the backtracking of Prolog, for example.

The above-mentioned working environment is produced by the first processor before performing the load balancing. The second processor requires such working environment to execute the divided OR process after the load balancing is performed. Because, when the second processor independently obtains a solution (or a processing result) of the initial goal by performing the divided OR process, the second processor may need all of the bind information which is produced by the first processor between a time when the initial goal is given and a later time when the first processor starts to perform the load balancing. In addition, the amount of such bind information must be increased nearly in proportion to the processing time. Therefore, the first processor must transfer quite a large amount of information representative of its working environment to the second processor when the first processor performs the load balancing on the second processor after a long processing time has been passed.

Since the first processor must divide the OR process and transfer its large amount of information representative of the working environment when every time the first processor performs the load balancing on the second processor, the original process of the first processor must be stopped so it performs intermittently. On the other hand, since the second processor receives the working environment of the first processor every time the load balancing is performed, the original process of the second processor must be stopped history information order to receive the large amount of information representative of the working environment of the first processor and to store such transferred information.

Therefore, each processor can not demonstrate its full processing ability. In addition, the load balancing is required between the processors at arbitrary and asynchronous times. Hence, the multiprocessor system suffers from the problem that it is impossible to obtain the parallel effect as described before.

Further, the conventional system requires an expensive network system to transfer large amounts of information at arbitrary and asynchronous times. Since the network system in this case is occupied for a long time in order to transfer the large amount of information, it becomes almost impossible to perform the load balancing between the processors. Therefore, the conventional multiprocessor system suffers from the above described problem in that the load becomes unbalanced.

The above-mentioned problem becomes serious in a recently developed sequential inference machine (or a Prolog machine), which machine can sequentially perform the inference by itself with high speed. When the multiprocessor system controls one thousand or more of such machines (i.e., the processors) in parallel, the conventional system has the tendency to cause the improvement of the data transfer speed of the network system to become smaller than that of the processing speed of each machine, as described before. As the number of the processors within the multiprocessor system increases, the above-mentioned tendency becomes even greater.

A sequential inference machine of 1 MLIPS (i.e., one Mega Logical Inference Per Second) produces a working environment having about 5 MW (i.e., five Mega Word) of information (in case of 40 Bit/W). For example, a serial link of 10 MBPS (i.e., ten Mega Bit Per Second) is actually required between two mutually adjacent processors as the network system which connects all one thousand of the sequential inference machines provided within the multiprocessor system. In this case, it is possible to transfer data of 0.25 MW per second (which is obtained by dividing 10 MBPS by 40 Bit/W) representative of the working environment between two mutually adjacent processors.

In this case, the processing time for performing the inference divided by the communication time of the network system becomes equal to 1/20. The value 20 which appears in the denominator is obtained by dividing 5 MW by 0.25 MW. Due to the load balancing (or due to the transfer of the large amount of information in particular), the sequential inference machine (i.e., the processor) must stop performing the original inference process for a long time. Hence, the apparent processing ability of the sequential inference machine must be lowered.

Since the operating processors and the network system are occupied in order to transfer the information representative of the working environments for a long time, it becomes impossible to perform the required load balancing so that the availability of the processor must be lowered. Thus, the parallel effect applied to the multiprocessor system must be lowered as described before.

SUMMARY OF THE INVENTION

It is therefore a primary object of the present invention to provide a method of load balancing processing in a multiprocessor system which can obtain a high parallel effect by performing the initial load balancing of the initial goal with a high speed when the logic programming language is execute in parallel in the multiprocessor system.

It is another object of the present invention to provide a method of load balancing processing in a multiprocessor system which remarkably reduces the amount of the information transferred between the processors so as to perform the load balancing at high speed and without intermittently stopping the execution of the original process of each processor so that a high parallel effect can be obtained, even when a network system having a reasonable price is used in the multiprocessor system.

In a first aspect of the invention, there is provided a multiprocessor system for processing a given load written by a predetermined programming language comprising:

a plurality of processors and a network system linking the processors, each of the processors comprising (a) first means for storing system information representing characteristics of the multiprocessor system and (b) second means for automatically and dynamically selecting a specific initial load segment from the given load by use of the system information without transferring information between the processors, whereby initial load balancing is obtained in the multiprocessor system.

In a second aspect of the invention, there is provided a multiprocessor system for processing a given load written by a predetermined programming language comprising:

a plurality of processors and a network system linking the processors, each of the processors comprising (a) first means for generating history information, the amount of which is smaller than that of information representative of the whole working environment of a source processor, while processing a specific load segment given to each processor, (b) second means for transferring the history information to a destination processor while operating the multiprocessor system, (c) third means for reproducing the working environment of the source processor by use of the history information transferred from a source processor, and (d) fourth means for processing the specific load segment by use of the reproduced working environment of the source processor, whereby load balancing is obtained in the multiprocessor system.

In a third aspect of the invention, there is provided a method of load balancing processing in a multiprocessor system having a plurality of processors and a network system linking the processors, comprising the steps of:

providing a computational task or load written in a predetermined programming language, storing system information representative of characteristics of the multiprocessor system, automatically and dynamically selecting a specific initial load segment for each processor from the given load by the use of the system information without transferring information between the processors, and performing the specific initial load segment processing in each processor independently, whereby initial load balancing is obtained in the multiprocessor system.

In a fourth aspect of the invention, there is provided a method of load balancing processing in a multiprocessor system having a plurality of processors and a network system linking the processors, comprising the steps of:

providing a load written in a predetermined programming language, generating history information in a first processor, the amount of which is smaller than that of information representative of the whole working environment of the first processor, while the first processor processes a specific load segment given thereto, transferring the history information from the first processor to a second processor while operating the multiprocessor system, dynamically reproducing the working environment of the first processor in the second processor by use of the history information transferred from the first processor, and processing a specific load segment in the second processor by use of the reproduced working environment of the first processor, whereby balancing is obtained between the first and second processors and a partial load segment of the first processor is shared with the second processor.

In a fifth aspect of the invention, there is provided a method of load balancing processing in a multiprocessor system having a plurality of processors and a network system linking the processors, comprising the steps of:

providing a load written in a predetermined programming language, storing system information representative of characteristics of the multiprocessor system, automatically and dynamically selecting a specific initial load segment for each processor from the given load by use of the system information, without transferring information between the processors, processing the specific initial load segment in each processor independently, whereby an initial load balancing is obtained in the multiprocessor system, generating history information in a first processor, the amount of which is smaller than that of information representative of the whole working environment of the first processor, while the first processor processes a specific load segment given thereto, transferring the history information from the first processor to a second processor while operating the multiprocessor system, dynamically reproducing the working environment of the first processor in the second processor by use of the history information transferred from the first processor, and processing a specific load segment in the second processor by the use of the reproduced working environment of the first processor, whereby load balancing is obtained between the first and second processors and a partial load segment of the first processor is shared with the second processor.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings.

DESCRIPTION OF THE PREFERRED EMBODIMENTS

Figure 3:
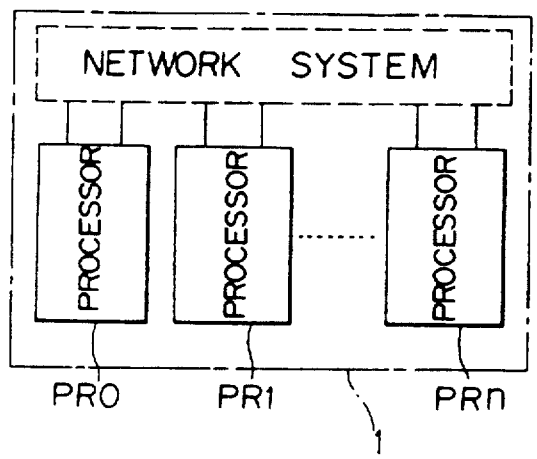
FIG. 3 is a block diagram showing an embodiment of a multiprocessor system according to the present invention.

Referring now to the drawings, wherein like reference characters designate like or corresponding parts throughout the several views, FIG. 3 is a block diagram showing all the elements of a multiprocessor system 1 according to the present invention. This multiprocessor system 1 (surrounded by a dashed line) provides a network system (surrounded by a dotted line) and a plurality of processors PR0 to PRn (where n denotes an integral number). These processors PR0 to PRn are connected to each other by the network system. The present invention is directed to the processors rather than the network system; hence, a description of the network system will be omitted from this specification.

[A] FIRST EMBODIMENT

Figure 4:
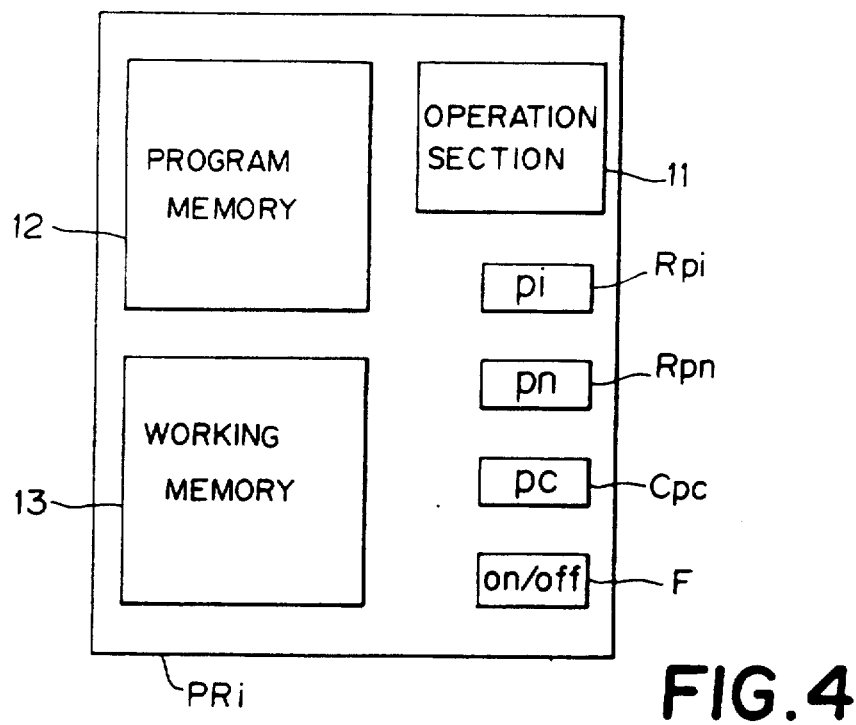
FIG. 4 is a block diagram showing a first embodiment of the processor which constitutes the multiprocessor system according to the present invention.

Next, a description will be given with respect to the structure of the first embodiment of a processor PRi (where i denotes an integral number lying between 1 to n) in conjunction with FIG. 4. In FIG. 4, the processor PRi comprises a register Rpi for storing data representative of a processor identifier pi, a register Rpn for storing data representative of a number pn of processors (hereinafter, referred to as assignable processors) which are subjected to the initial load balancing of the initial goal, a counter Cpc for counting a number pc of the branches at each node (i.e., at each process for searching the desirable branch in the initial load balancing), a flag section F for storing a flag representing whether the initial load balancing has been performed or not, an operation section 11 for performing operations and big-or-small judgment which will be described later, a program memory 12 for storing programs written in the logic programming language to be executed, and a working memory 13 for storing data representative of the working environments which are used for executing the programs.

Figure 5:
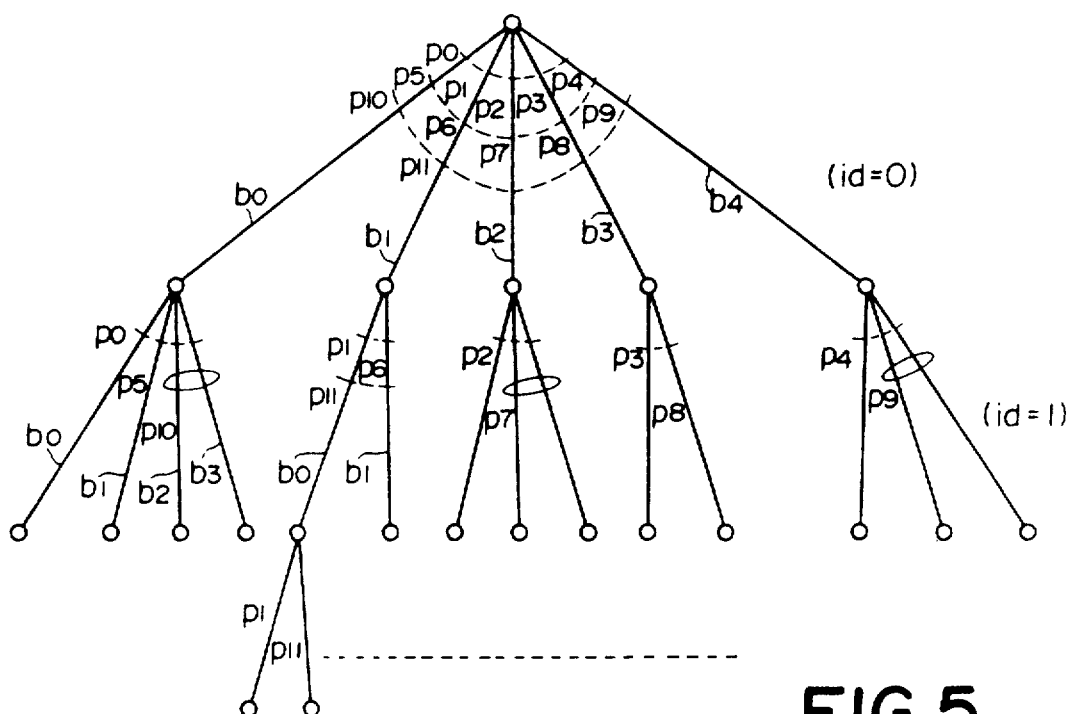
FIGS. 5 and 6 show inference trees for explaining the initial load balancing of the initial goal performed in the multiprocessor system according to the present invention.

Next, a description will be given with respect to a "strategic procedure" for performing the OR process in each processor PRi in conjunction with FIG. 5. FIG. 5 shows a strategic procedure for performing the initial load balancing in the case where the number of initially assignable processors is set to twelve. In FIG. 5, each of characters p0 to p11 designates each of the identifiers pi of the twelve processors.

In the following description, a number id representing an inference depth of the logic programming language varies "0", "1", "2", . . . as the inference depth becomes deeper. In addition, the number id equals "0" at the initial goal stage. Further, a number m (where m denotes an integral number) of branches bm connected to a common node varies "0", "1", ... from the left most branch in turn.

(I) First, the multiprocessor system initializes the registers Rpi and Rpn, the counter Cpc and the flag section F.

(II) Secondly, the assignable processors are equally assigned to the branches of the inference tree which branches from an initial goal point. For example, five processors having the identifiers p0, p1, p2, p3 and p4 are respectively and dynamically assigned to five branches b0, b1, b2, b3 and b4 connected to the common node (i.e., the initial goal point) from the left most branch. Similarly, seven other processors having the identifiers p5 to p11 are assigned to the five branches b0 to b4. Thus, three processors having the identifiers p0, p5 and p10 are assigned to the branch b0. In addition, the three processors having the identifiers p1, p6 and p11 are assigned to the branch b1. Similarly, the two processors having the identifiers p4 and p9 are assigned to the branch b4.

As described above, plural processors are assigned to each of the branches b0 to b4. The processors assigned to one branch designate the assignable processors in a next stage.

(III) Next, the present system performs the initial load balancing in the direction of the inference depth. Similar to the above-mentioned procedure (II), the processors assigned to one branch are assigned to next branches connected to that one branch. When one processor is assigned to each of the next branches, the initial load balancing is completed. In this case, when the number pn of the assignable processors is smaller than the number of assignable branches, a branch next to the branch assigned by the last processor is saved for the last processor (i.e., the right branch is saved for the last processor), but branches next to the branches each assigned by the other processors are not saved (i.e., the right branches are left for the other processors).

For example, the processors having the identifiers p0, p5 and p10 are respectively assigned to the branches b0, b1 and b2 in inference depth id = 1, and the branch b3 is saved for the processor having the identifier p10. Similarly, other branches are assigned by the corresponding processors as shown in FIG. 5.

The above is a diagrammatical explanation of the initial load balancing of the initial computational task or goal. Next, a generalized description will be given with respect to the initial load balancing.

(1) First the present system initializes the registers Rpi and Rpn, the counter Cpc and the flag section F as described below.

(a) The identifier pi of each processor is stored in the register Rpi.

(b) The number pn of the assignable processors is stored in the register Rpn.

(c) The flag "on" indicating that the processor is initialized is set in the flag section F.

(2) The inference depth id equals "k", the value of which is sequentially varied as 0, 1, ...

(a) In the case where the number pn of the assignable processors is larger than one, the initial load balancing will be performed in the following sequence of procedures (i) to (v):

(i) The counter Cpc counts the present number pc of the branches. In FIG. 5, the count value of the counter Cpc equals "5".

(ii) The value of the identifier pi stored in the register Rpi is divided by the count value of the counter Cpc so as to obtain a quotient of "a" and a remainder of "b". Based on the quotient and remainder, the processors are assigned to the corresponding branches.

In the case of the processor having the identifier pi which equals "8" as shown in FIG. 5, such value "8" is divided by the value "5" so as to obtain a quotient of "1" and a remainder of "3" (i.e., a = 1 and b = 3). This means that such processor is assigned to the branch b3 as the second processor.

The above value "a" is stored in the register Rpi as a new identifier pi.

(iii) Next, the present system selects a branch corresponding to the remainder "b". When the remainder "b" is smaller than a value of (pn − 1), a right branch of such branch is cut. However, when the remainder "b" is not smaller than the value of (pn − 1), a right branch of such branch is saved.

For example, the processors p0, p5 and p10 can be assigned to the four branches b0 to b3 at the left most node at inference depth id = 1. In this case, the number pn of the assignable processors equals three (i.e., p0, p5, and p10) so that the value of (pn − 1) equals two. Hence, the processors p0 and p5 are respectively assigned to the branches b0 and b1. On the other hand, the branch b3 and the branch b2 are saved, and the processor p10 is assigned to both of the branches b2 and b3.

(iv) The number pn, equal to the number of processors, which is stored in the register Rpn, is divided by the count value, equal to the number of branches at the node, which is stored in the counter Cpc so as to obtain a quotient "c" and a remainder "d". In the initial goal stage (id = 0) shown in FIG. 5, pn (i.e., twelve") is divided by the number of branches (i.e., five) so as to obtain a quotient "c" = "2" and a remainder "d" = "2". When the present system compares the remainder "b" with the remainder "d" and finds that the remainder "b" is smaller than the remainder "d", a value (c + 1) is stored in the register Rpn. On the other hand, when the remainder "b" is equal to or larger than the remainder "d", the value "c" is stored in the register Rpn.

In the above-mentioned case, where b = 1, d = 2, and c = 2, d > b so three (i.e., c + 1) processors are now assigned to each of the branches b0 and b1. In addition, two (i.e., c) processors are assigned to each of the branches b2, b3 and b4.

As described heretofore, "c" (i.,e., two) processors are assigned to each of the branches (i.e., the branches b2 to b4) on the right side of the inference tree (i.e., the branch b1) assigned with the last processor (i.e., the processor p11). On the other hand, (c + 1) (i.e., three) processors are assigned to each of the lefthand branches (i.e., the branches b0 and b1).

(v) Next, the processes similar to the processes described in the above procedures (i) to (iv) in (2) are repeatedly performed in case of the inference depth id = m + 1 based on a newly inputted identifier pi and a newly determined number pn of assignable processors.

In a left place of the inference tree shown in FIG. 5 at the inference depth id = 1, the above-mentioned initial load balancing is performed by use of the number pn = 3 and by varying the identifier pi as 0, 1 and 2.

(b) In the case where the number pn of the assignable processors is equal to or smaller than one, the initial load balancing will be performed as follows.

By setting the flag "off" in the flag section F, the initial load balancing is completed. Thus, the initial load balancing as shown in FIG. 5 will be performed.

Figure 6:
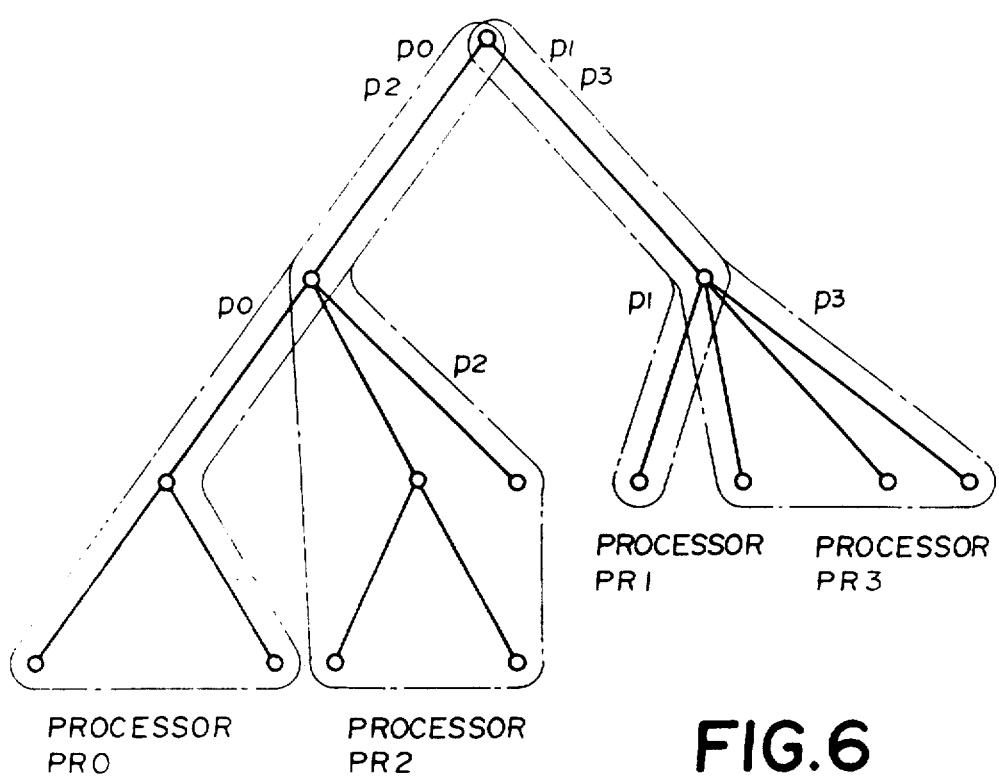

The Table (see below) shows how the values stored in the registers of each processor vary, in the case where the initial goal is divided into plural OR processes based on the "strategic procedures" described in column (a) in the example of four processors shown in FIG. 6. The contents of the following Table based on the procedures described in column (a) is easily understood; hence, description thereof will be omitted.

In the following Table, a row portion of the remainder "b" teaches how to select the searching branch in each inference depth id. More specifically, this row portion teaches whether the right branch is cut or saved. In addition, rows of "Rpi" and "Rpn," (where "." means "dash") and rows of "Rpi" and "Rpn" both have the same contents between the columns of id=0 and id=1 and between the columns of id=1 and id=2 as well.

TABLE

| Inference Depth | Processor PR0 | Processor PR1 | Processor PR2 | Processor PR3 |
|---|---|---|---|---|
| id = 0 | Rpi = 0 | Rpi = 1 | Rpi = 2 | Rpi = 3 |
|  | Rpn = 4 | Rpn = 4 | Rpn = 4 | Rpn = 4 |
|  | Cpc = 2 | Cpc = 2 | Cpc = 2 | Cpc = 2 |
|  | a = 0 | a = 0 | a = 1 | a = 1 |
|  | b = 0 | b = 1 | b = 0 | b = 1 |
|  | (cut) | (cut) | (cut) | (cut) |
|  | c = 2 | c = 2 | c = 2 | c = 2 |
|  | d = 0 | d = 0 | d = 0 | d = 0 |
|  | Rpi' = 0 | Rpi' = 0 | Rpi' = 1 | Rpi' = 1 |
|  | Rpn' = 2 | Rpn' = 2 | Rpn' = 2 | Rpn' = 2 |
| id = 1 | Rpi = 0 | Rpi = 0 | Rpi = 1 | Rpi = 1 |
|  | Rpn = 2 | Rpn = 2 | Rpn = 2 | Rpn = 2 |
|  | Cpc = 3 | Cpc = 4 | Cpc = 3 | Cpc = 4 |
|  | a = 0 | a = 0 | a = 0 | a = 0 |
|  | b = 0 | b = 0 | b = 1 | b = 1 |
|  | (cut) | (cut) | (save) | (save) |
|  | c = 0 | c = 0 | c = 0 | c = 0 |
|  | d = 2 | d = 2 | d = 2 | d = 2 |
|  | Rpi' = 0 | Rpi' = 0 | Rpi' = 0 | Rpi' = 0 |
|  | Rpn' = 1 | Rpn' = 1 | Rpn' = 1 | Rpn' = 1 |
| id = 2 | Rpi = 0 | Rpi = 0 | Rpi = 0 | Rpi = 0 |
|  | Rpn = 1 | Rpn = 1 | Rpn = 1 | Rpn = 1 |
|  | F off | F off | F off | F off |

As described heretofore, the processors within the present system simultaneously and independently select the OR processes by using the identifier pi of each processor and the number pn of the assignable processors. Hence, it is possible to perform the initial load balancing of the initial goal at high speed and without transferring information between the processors.

In addition, the present system can reduce the amount of the information that must be transferred because each processor within the present system produces a part of the information which would have been transferred from another processor given the initial goal in a conventional system. In. FIG. 6, the processors p0 and p2 execute the same load of the branch b0 in parallel, for example. In this case, the processors p0 and p2 produce the same working environment therein, hence, it is unnecessary to transfer the information between the processors p0 and p2. As described heretofore, it is possible to reduce the amount of the information which accompanies the initial load balancing and which is transferred between the processors.

Incidentally, the initial load balancing of the initial goal described herein aims to assign the initial loads to all processors. Meanwhile, the first embodiment does not relate to the load balancing after the initial load balancing, hence, description thereof will be omitted.

As described heretofore, it is possible to obtain the following effects (or advantages) (i) to (iii) in the first embodiment.

(i) It is unnecessary to transfer the information between the processors when the initial load segments are dynamically assigned to all of the processors after the initial goal is given to the present system. Hence, the requirement for performing the initial load balancing must not be concentrated in one processor, and it is possible to perform the initial load balancing of the initial goal at high speed.

(ii) The specific OR process is assigned to each processor, and the processors which execute the same partial OR process in parallel produce the same partial information. Hence, it is unnecessary to transfer the partial information between such processors while performing the initial load balancing. Thus, it is possible to reduce the amount of the information in the first embodiment processor of FIG. 4.

As a result, it is possible to reduce the communication capacity (i.e., the transfer speed and the transfer ability) of the present network system applied to the first embodiment of the multiprocessor system to less than that of a conventional network system. Hence, the scale and the price of the present network system can be reduced. However, it is possible to obtain a parallel effect very similar to that in a conventional system. In other words, if a conventional network system is applied to the present multiprocessor system, the parallel effect of the present multiprocessor system can be raised remarkably.

(iii) It can be expected that each processor realizes a high availability just after the initial goal is given to the present multiprocessor system. In addition, the present system can reduce the amount of the information transferred between the processors. Hence, the present multiprocessor system can obtain a high parallel effect as a whole.

[B] SECOND EMBODIMENT

Next, a description will be given with respect to a second embodiment of the processor PRi in conjunction with FIG. 7. This second embodiment of the processor PRi is essentially constituted by a central processing unit (CPU) 21, a memory 22, a first information generating section 23 and a second information generating section 24. The first information generating section 23 generates history information which is necessary for reproducing the working environment, and such history information is transferred while the processor is performing the load balancing. On the other hand, the second information generating section 24 generates the necessary working environment based on the history information which is transferred thereto, while it is performing the load balancing.

Figure 7:
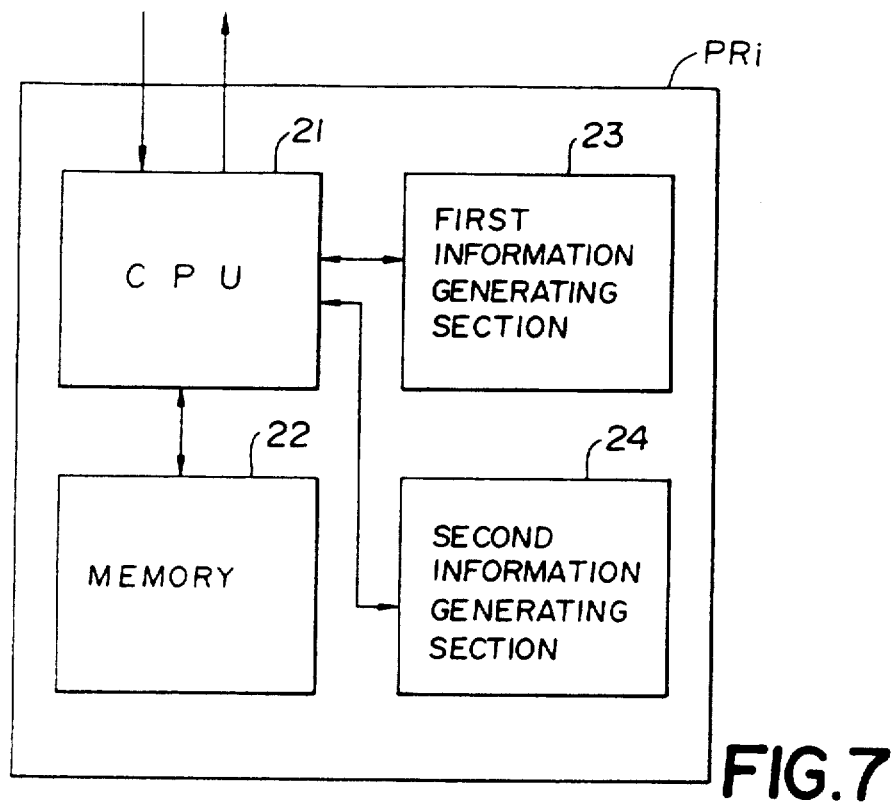
FIGS. 7 and 8 are block diagrams both showing a second embodiment of the processor within the multiprocessor system according to the present invention.
Figure 8:
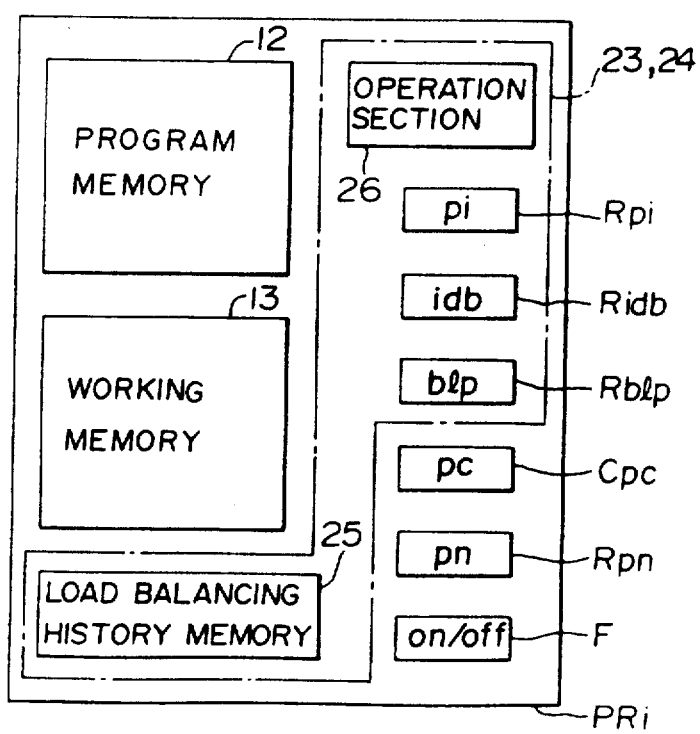

FIG. 8 is a block diagram for explaining a function of the above-mentioned second embodiment of the processor PRi shown in FIG. 7. More specifically, FIG. 8 is a block diagram for explaining the function of the processor PRi which executes a given load written in the logic programming language, i.e., Prolog. The parts shown in FIG. 8 corresponding to those shown in FIG. 4 are designated by the same characters, hence, detailed description thereof will be skipped.

In FIG. 8, the first and second information generating sections 23 and 24 (surrounded by a dashed line) comprise the register Rpi for storing the identifier pi of each processor PRi, a register Ridb for storing an inference depth idb of the load balancing, a register Rblp for storing an identifier blp of the OR process which is assigned to the processor PRi, a load balancing history memory 25 for storing a pair of the inference depth idb and the identifier blp both of which depend on the times when the load balancing is performed, and an operation section 26 for performing simple operations by using data stored in the above registers Rpi, Ridb and Rblp, and data stored in the above memory 25.

In addition, the processor further provides the counter Cpc for counting the number pc of the searching branches at each node, the register Rpn for storing the number pn of the connected assignable processors and the flag section F for indicating whether the initial load balancing has been performed or the working environment has been generated.

Further, the program memory 12 stores the programs written by the logic programming language, and the working memory 13 is used for storing the working environment while the programs are executed. Incidentally, the load balancing history memory 25 can be included within the working memory 13.

Next, a description will be given with respect to the operations of the second embodiment.

First, a description will be given in conjunction with FIG. 9 with respect to the case where the first processor performs the load balancing for the second processor. More specifically, FIG. 9 shows a inference tree for explaining examples of a procedure for generating the history information which is essential for producing the working environment and another procedure for producing the working environment (which will be necessary after performing the load balancing) by use of the transferred history information Incidentally, the first processor is designated by the character PR1 and the second processor is designated by the character PR2 for convenience sake.

(1) A PROCESS FOR GENERATING HISTORY INFORMATION ESSENTIAL FOR REPRODUCING WORKING ENVIRONMENT OF FIRST PROCESSOR PR1

Figure 9:
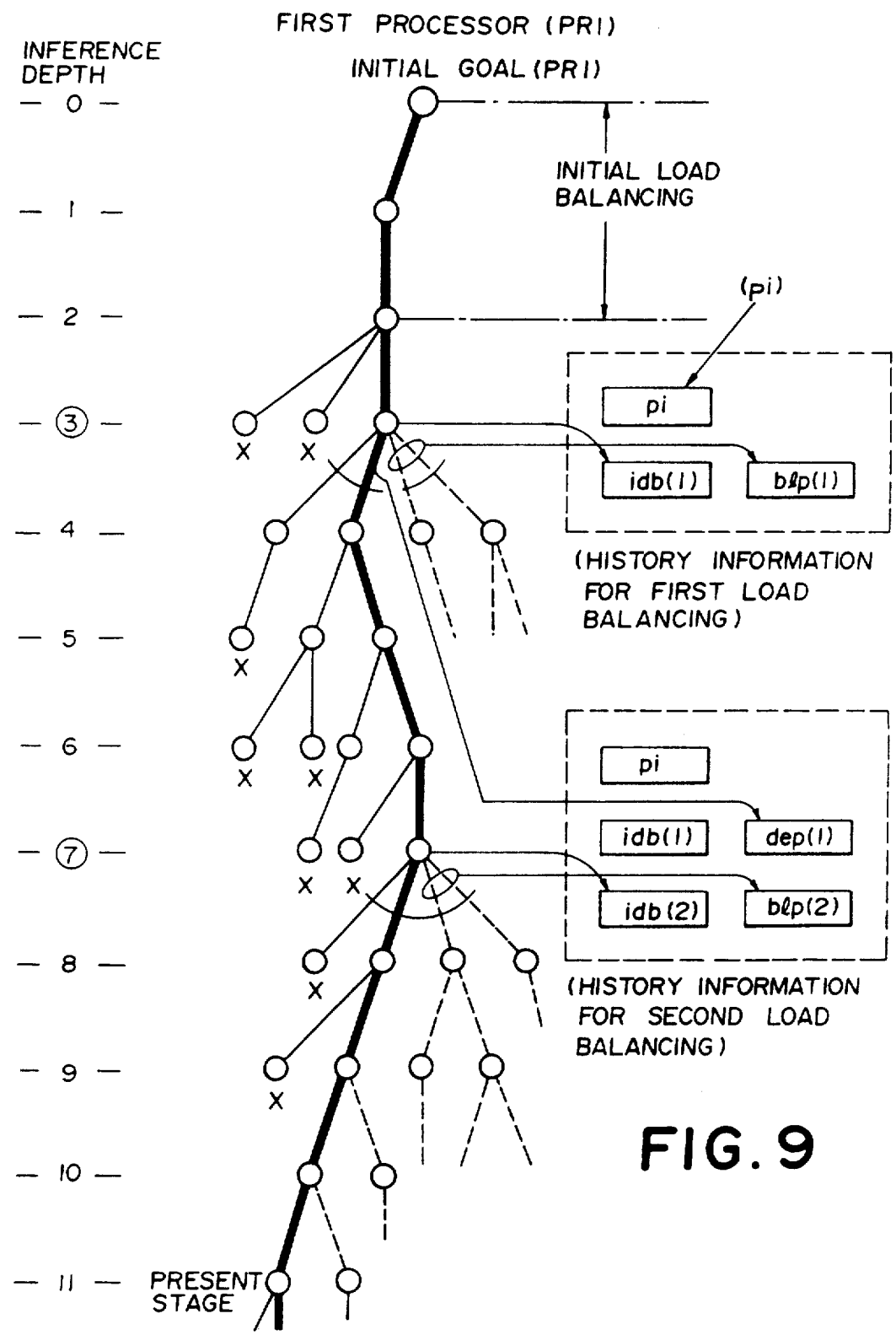
FIG. 9 shows a partial inference tree of the logic programming language for explaining a process for producing in the first processor history information (represented by data of three words or five words) to be transferred.

As shown in FIG. 9, the first processor PR1 performs the load balancing twice, once at inference depth "3" and the other at "17". In FIG. 9, the (executed) branches which have been already executed are drawn by relatively fine lines, the (executing) branches which are now executed are drawn by bold lines, and the (un-executed) branches which have been not executed are drawn by dotted lines. The present load balancing divides the branches (or the OR processes) which are not executed but which are relatively near to the node representative of the initial goal.

Conventionally, in a prior art system the first processor PR1 transfers all the information representative of the working environments to the second processor PR2. Such working environments are generated in the executing branches drawn by the bold lines before the load balancing is performed (i.e., before the unexecuted branches drawn by the dotted lines). Thereafter, the second processor PR2 executes the unexecuted branches.

Contrary to the prior art, according to the present invention, the first processor PR1 transfers the history information essential for reproducing the working environments thereof to the second processor PR2 in the second embodiment. In this case, the data representative of the history information are equal to three words in a first load balancing, five words in a second load balancing and (1+2n) words in an n-th load balancing, respectively. Then, the second processor PR2 reproduces the working environments generated in the executing branches (written by the bold lines) of the first processor PR1 by use of the transferred history information.

First, each processor PRi performs the initial load balancing of the initial goal as described in the first embodiment. This initial load balancing is performed by use of the registers Rpi and Rpn, the counter Cpc, the flag section F and the operation section 26. Basically, such initial load balancing is obtained by repeatedly performing a procedure in which each branch (or each OR process) is equally shared by each processor.

After the initial load balancing is obtained, the branches are searched based on a predetermined priority (i.e., the depth-first-search) such that the branches are searched from the upper side to the lower side and from the left side to the right side in accordance with a priority of the inference depth in the first processor PR1. When the correct branch fails to be searched, the first processor PR1 backtracks to the preceding node and restarts in a search for the correct branch. At the inference depths "3" and "7", a partial load segment of the first processor PR1 is shared with other processors.

In the first load balancing, the first processor PR1 transfers the history information in data formations of three words which represent (a) the identifier pi of the first processor PR1, (b) the inference depth $idb(1)=3$ of the load balancing and (c) the identifier blp(1) of the OR process which will be shared with another processor.

The above-mentioned (a), i.e., the identifier pi must be varied in the initial load balancing. As the value of such identifier pi, however, the first processor PR1 uses the identifier pi which was initially given thereto in the first initial load balancing. Meanwhile, in the case where a branch bep(1) is selected at the inference depth "3", the corresponding registers respectively store a pointer blp(1) designating the unexecuted OR process and the inference depth idb(1). The pointer blp(1) means the address of the program memory 12 or the information representative of the number of the branch. Thus, the above-mentioned (b), i.e., inference depth idb, and (c), i.e., the identifier blp of the OR process, can be obtained.

As the history of the load balancing, the memory 25 stores the information representative of the inference depth $idb(1)=3$ and the selected branch bep(1).

In the second load balancing, the first processor PR1 transfers the history information in data formations of five words which represent (a) the identifier pi of the first processor PR1, (b) the inference depth $idb(1)=3$ which is stored in the memory 25 in the first load balancing, (c) the selected branch bep(1) which was stored in the memory 25 in the first load balancing, (d) a new inference depth $idb(2)=7$ of the second load balancing and (e) an identifier idb(2) of the OR processor to be subjected to the second load balancing.

In the case where the branch bep(2) is selected at the inference depth "7", the corresponding registers respectively store a pointer blp(2) for the un-executed OR process and the inference depth $idb(2)=7$. Thus, the above-mentioned (d), i.e., inference depth $idb(2)=7$, and (e), i.e., identifier idb(2), can be obtained.

Similar to the first load balancing, the memory 25 stores the inference depth idb(2) and the selected branch bep(2) at the present stage as the history of the second load balancing. These histories of the first and second load balancings will be identical to a part of the history information which will be transferred from the first processor PR1 in the next load balancing.

(2) A PROCESS FOR REPRODUCING THIS WORKING ENVIRONMENT OF THE FIRST PROCESSOR PR1 IN SECOND PROCESSOR PR2

The working environments of the first processor PR1 will be necessary for the second processor PR2 after the load balancing is performed. Such working environments are reproduced by use of the history information transferred from the first processor PR1 to the second processor PR2.

Next, a description will be given, with respect to the above-mentioned process for reproducing the working environments of the first processor PR1 in the second processor PR2.

The history information transferred from the first processor PR1 to the second processor PR2 includes the following information elements.

Transferred History Information (a) The identifier pi of each processor
(b) The inference depth idb of the load balancing
(c) The identifier blp of the OR process shared by the second processor PR2

The amounts of the above two information elements (b) and (c) will be increased in proportion to the time it takes for performing the load balancing.

The second processor PR2 stores the transferred history information, including the above-mentioned information elements (a) to (c). Thereafter, the second processor PR2 proceeds with the process given thereto in accordance with the following algorithm. Incidentally, the inference depth will be equal to idc at the present stage in the second processor PR2 in the following description.

ALGORITHM FOR REPRODUCING THE WORKING ENVIRONMENT OF THIS FIRST PROCESSOR BY USE OF THE TRANSFERRED HISTORY INFORMATION

The process for reproducing the working environments of the first processor PR1 in the second processor PR2 at inference depth idc will proceed in accordance with the following steps.

(a) INITIALIZATION OF COUNTER, REGISTERS, MEMORY AND FLAG SECTION

Initialization of the counter Cpc, the registers Rpi and Rpn:

The identifier pi of the processor is set to the register Rpi;

The number pn of the assignable processors is set to the register Rpn:

The value "0" is set to the counter Cpc.

(ii) Initialization of the flag section F:

The flag "on" representing that the initial load balancing is proceeding or the working environment is reproducing is set to the flag section F.

(iii) Initialization of the memory 25:

The memory 25 stores both of the inference depth idb of the load balancing and the identifier blp of the OR process shared by the second processor PR2.

(iv) Initialization of the registers Ridb and Rblp:

The registers Ridb and Rblp store the top word of the data stored in the memory 25 in the sequence of the inference depth; from the inference depth having the smallest number to the inference depth having the largest number.

(b) EXECUTION OF INITIAL LOAD BALANCING BY USE OF REGISTERS Rpi, Rpn AND COUNTER Cpc

Figure 10:
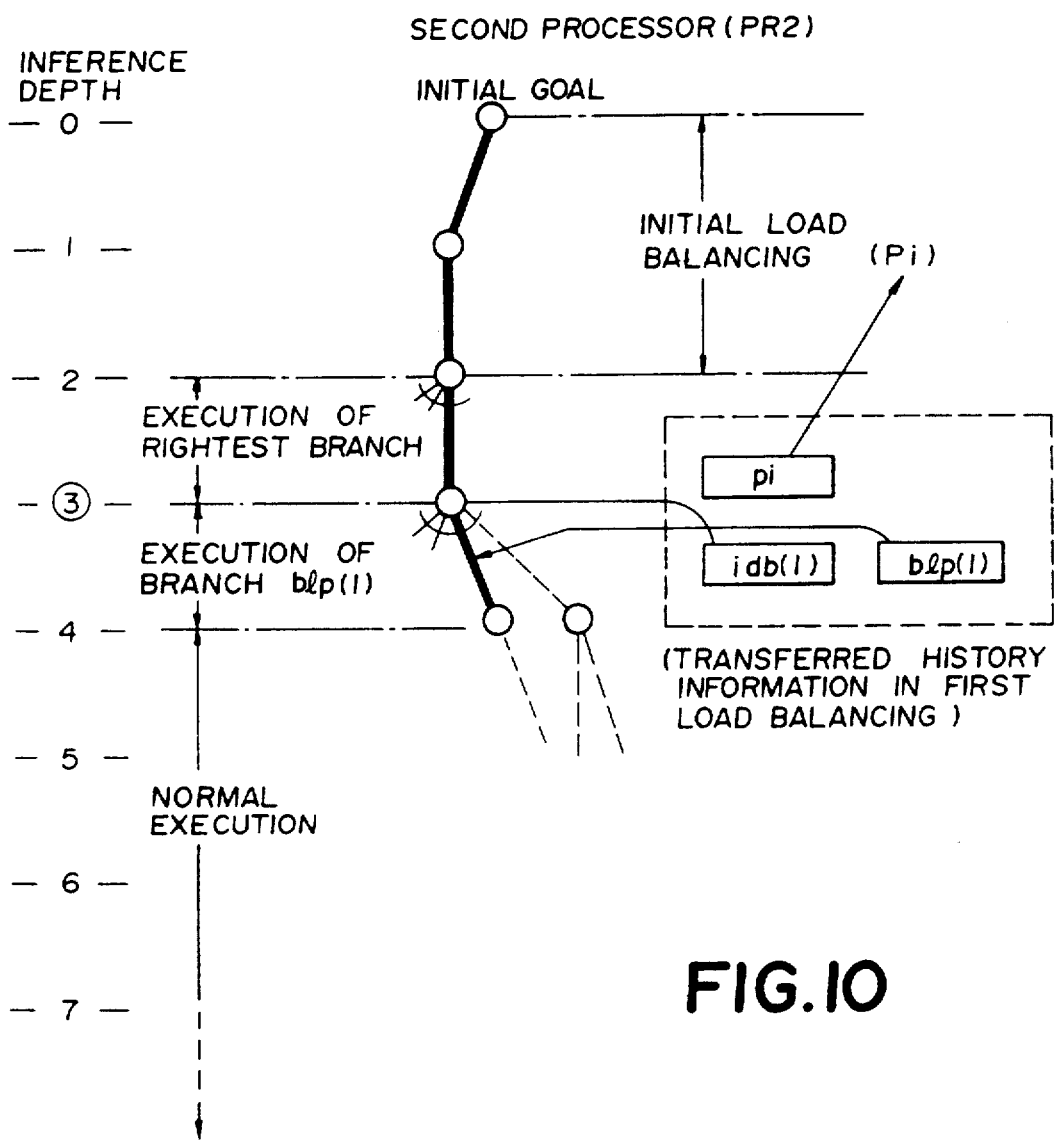
FIG. 10 shows a partial inference tree for explaining a process for reproducing a required working environment by the use of the transferred history information (represented by data of three words) in the second processor.

As shown in FIG. 10 and the following figures, this initial load balancing is executed by use of the identifier pi of the first processor PR1. More specifically, the second processor PR2 continuously performs the initial load balancing as described in the initial load balancing of the first processor PR1 shown in FIG. 9 until the initial load balancing is completed (c) PROCEDURES FOR REPRODUCING WORKING ENVIRONMENTS OF FIRST PROCESSOR AFTER INITIAL LOAD BALANCING (i) In the case where the inference depth idc is smaller than the value of the register Ridb, the right most branch is selected to be executed at every inference depth. Thereafter, next inference depth idc=idc+1 is set, and the above process is repeatedly performed at this next inference depth.

(ii) In another case where the inference depth idc equals the value of the register Ridb:

If the last word is read from the memory 25, the branch corresponding to the value of the register Rblp is executed and the right branch thereof is saved. Then, "off" is set to the flag section F so as to finish reproducing the working environments (i.e., so as to complete the load balancing).

If the word read from the memory 25 is not the last word, the branch corresponding to the value of the register Rblp only is executed and the right branch thereof is cut. Thereafter, next word data read from the memory 25 are stored in the registers Ridb and Rblp, and the next inference depth idc=idc+1 is set so as to repeatedly perform the above-mentioned process of (i).

According to the above-mentioned procedures, a specific working environment of the first processor PR1 is reproduced in the second processor PR2 before the first processor PR1 performs the load balancing The second processor PR2 can reproduce such specific working environment based on the history information transferred from the first processor PR1. Such specific working environment will be essential for the second processor PR2 after the first processor PR1 performs the load balancing.

In the procedures shown in FIG. 10, the second processor PR2 reproduces the working environment of the first processor PR1 (which is generated before the first processor PR1 performs the load balancing) by use of the history information of three words transferred to the second processor PR2 at first. Such a working environment is shown by bold lines before a node representative of the inference depth "3". Thereafter, the second processor PR2 proceeds to execute certain processes after the load balancing. Such certain processes are shown by dotted lines after the node representative of the inference depth "3".

In FIG. 10, the initial load balancing is first performed by use of the identifier pi of the first processor PR1. Next, the right most branch is selected and executed until the inference depth reaches the inference depth idb(1)=3 where the load balancing is performed. Lastly, the second processor PR2 selects and executes the branch represented by the identifier blp(1) of the shared OR process which is shared with the second processor PR2 at the inference depth "3".

In the above case, the identifier blp(1) of the shared OR process is indicated by the last word of the data stored in the memory 25. Thus, the right branch corresponding to the last word of the memory 25 is saved because such right branch is likely to be executed.

According to the above-mentioned procedures, the load balancing between the first processor PR1 and the second processor PR2 is completely obtained at the inference depth "3" by only transferring the data of three words.

Figure 11:
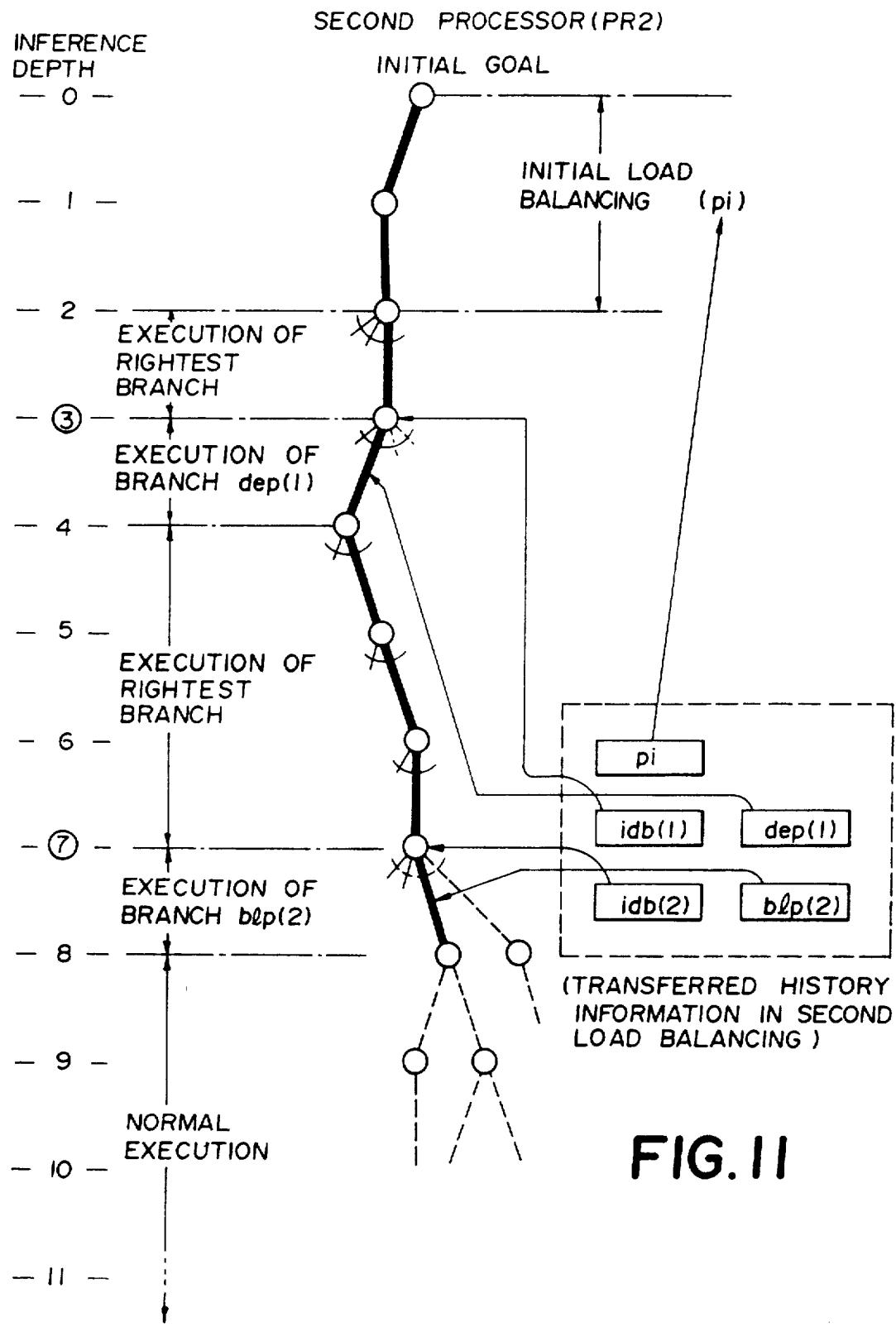
FIG. 11 shows a partial inference tree for explaining a process for reproducing a required working environment by use in the second processor of the transferred history information (represented by data of five words)

In the procedures shown in FIG. 11, the second processor PR2 at first reproduces the working environment of the first processor PR1 (which is generated before the first processor PR1 performs the load balancing) by use of the five words of history information transferred to the second processor PR2. Such a working environment is shown by bold lines before a node representative of the inference depth "7". Thereafter, the second processor PR2 proceeds to execute certain processes after the load balancing. Such certain processes are shown by dotted lines after the node representative of the inference depth "7".

In FIG. 11, at first the initial load balancing is performed by use of the identifier pi of the first processor PR1 Next, the right most branch is selected and executed until the inference depth reaches the inference depth idb(1)=3, the data of which is stored in the memory 25. At this inference depth "3", the branch bep(1) stored in the memory 25 is only selected and executed. In this case, this branch bep(1) does not correspond to the last word stored in the memory 25; hence, the right branch of this branch bep(1) is cut.

Next, the second processor PR2 selects and executes the right most branch at every inference depth until the inference depth reaches the inference depth idb(2)=7 where the load balancing is performed. Lastly, the second processor PR2 selects and executes the branch represented by the identifier blp(2) of the shared OR process which is subjected to the load balancing at the inference depth "7". This branch corresponds to the last word stored in the memory 25, hence, the right branch of this branch is not cut but saved.

According to the procedures shown in FIG 11, the first processor PR1 performs the load balancing for the second processor PR2 at the inference depth "7" by only transferring the five words of history information.

Figure 12:
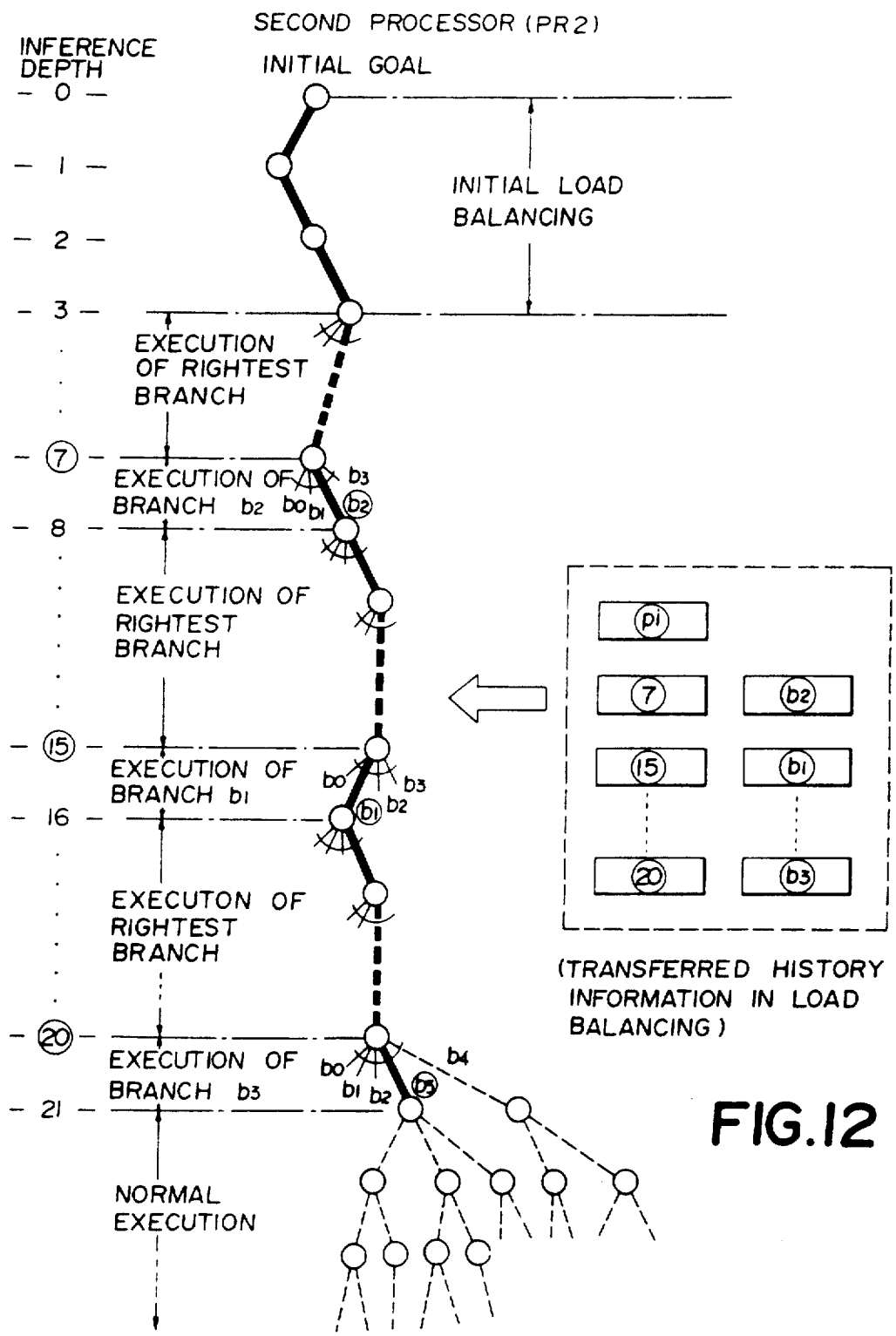
FIG. 12 shows a partial inference tree for explaining a process of the second processor for reproducing a required working environment by use of the transferred history information represented by data of $(1+2n)$ words at time periods "n" for performing the load balancing in the first processor.

In the general procedures shown in FIG. 12, the second processor PR2 first reproduces the working environment of the first processor PR1 (which is generated before the first processor PR1 performs the load balancing) by use of the history information of (1+2n) words transferred to the second processor PR2. Thereafter, the second processor PR2 proceeds to execute certain processes after the load balancing.

Similar to the procedures shown in FIGS. 10 and 11, the second processor performs the initial load balancing by use of the identifier pi of the first processor PR1.

Thereafter, until the inference depth reaches at an inference depth "20" where the load balancing will be performed again, the second processor PR2 selects and executes the branches b2 and b1 at the inference depths "7" and "15" the data of which are stored in the memory 25, for example. Since these branches b2 and b1 do not correspond to the last word stored in the memory 25, the right branches b2 and b1 are cut. At the inference depths other than the inference depths "7" and "15" and smaller than the inference depth "20", the right most branch is selected and executed at every inference depth.

Lastly, the second processor PR2 selects and executes the branch b3 of the shared OR process at the inference depth "20" where the load balancing is performed. This branch corresponds to the last word stored in the memory 25, hence, the right branch is not cut, but saved.

According to the procedures described heretofore, the first processor PR1 can perform and complete the load balancing for the second processor PR2 at an arbitrary inference depth by transferring only the history information, the amount of which corresponds to the number of times the first processor PR1 has performed the load balancing in the past. In the second embodiment, the second processor PR2 reproduces the working environment (which is obtained between the initial goal and the present inference depth) of the first processor PR1 by use of the history information transferred thereto. However, the second processor PR2 can re-use a partial working environment thereof so as to reproduce a partial working environment of the first processor PR1 by comparing the transferred history information with the information stored in the second processor PR2. This information stored in the second processor pR2 is identical to the previous identifiers pi and the contents of data stored in the memory 25.

As described in the second embodiment, in the multiprocessor system which executes the logic programming language (e.e., Prolog), the first processor PR1 transfers the history information of (1+2n) words, which is a relatively small amount, to the second processor PR2 every time the first processor PR1 performs the load balancing. The amount of this transferred history information corresponds to the number of times "n" that the load balancing has been performed in the first processor PR1. By using the transferred history information, the second processor PR2 reproduces the working environment which is essential for the second processor PR2 after the first processor PR1 performs the load balancing. Thereafter, the second processor PR2 proceeds to execute the process thereof after the load balancing by use of the reproduced working environment. Comparing the second embodiment with a conventional system, the following advantages (1) to (4) can be obtained.

(1) There is no need to intermittently stop performing the original process of each processor in the load balancing. Hence, it is possible to perform the load balancing with a high speed and with the transfer of quite a small amount of information between the processors.

(2) In particular the advantage of the second embodiment is effective when the logic programming language (i.e., Prolog) is applied to the multiprocessor system. The conventional multiprocessor system suffers from problems due to the overheads which are caused by the load generation, the communication requirements for transferring quite a large amount of the working environment data, the load storing and the like. However, the second embodiment can eliminate such overheads a described before. Hence, it is possible to realize a multiprocessor-type parallel Prolog machine having high processing and transferring speeds and also having a high parallel effect.

(3) Instead of transferring the working environment which has quite a large amount of information which is proportional to the number of times the inference process is performed, the second embodiment transfers the history information in quite small amounts of information which correspond to the number of times "n" the load balancing is performed (e.g., the history information of (1+2n) words when Prolog is applied to the second embodiment). Thus, the load balancing of the second embodiment is completed. Hence, it is possible to remarkably reduce the quantity of communication necessary for the transfer of information in the load balancing. In other words, the number of times the load balancing is performed can be lowered to much less than those for performing the inference process.

Comparing the network system of the present multiprocessor system with that of a conventional multiprocessor system, the communication capacity of the second embodiment can be remarkable reduced over that of the conventional system. Hence, the second embodiment can obtain a parallel effect similar to that of the conventional multiprocessor system, even when the second embodiment uses a network system having a reasonable price and a small scale. In other words, it is possible to realize a multiprocessor system having a parallel effect higher than that of a conventional multiprocessor system when the second embodiment employs a network system similar to that of the conventional multiprocessor system.

(4) The second embodiment is constructed by additionally connecting several registers and memories to the existing sequential inference machine (or the existing Prolog machine) and connecting the Prolog machines with each other over a simple network system. According to the procedures described before, the second embodiment generates the history information to be transferred in the load balancing and reproduces the essential working environment by using the transferred history information, whereby the second embodiment can perform the load balancing with high speed. In addition, it is possible to realize a multiprocessor-type parallel Prolog machine having a high speed and a high parallel effect.

Figure 1:
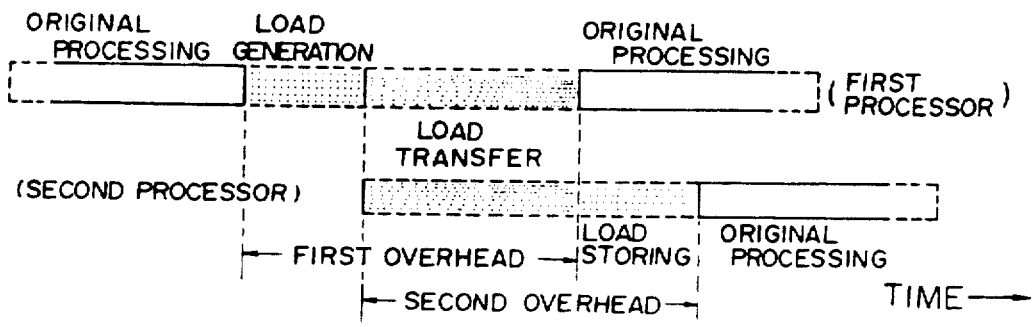
FIG. 1 shows time charts for explaining the overhead that inevitably accompanies load balancing in conventional multiproccesor systems.
Figure 2:
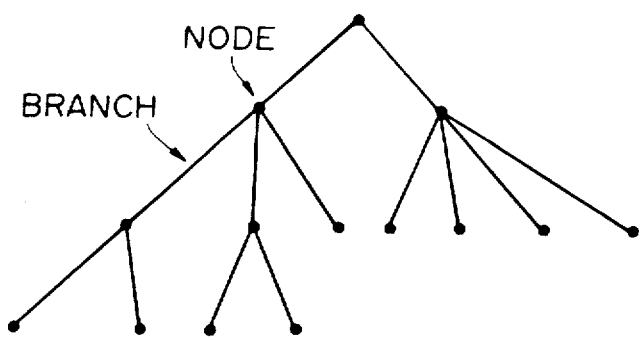
FIG. 2 shows an example of an inference tree representing a solution of the Prolog program.

As described in the above-mentioned advantages (1) to (4), the second embodiment can eliminate the overhead which is inevitably caused in conventional load balancing as shown in FIG. 1. Hence, the problems which must occur in the conventional system can be eliminated by the second embodiment.

Incidentally, the present invention is not limited by the method of selecting and generating the history information which is essential for reproducing the working environment, and another method of reproducing the necessary working environment may be used.

In addition, the present invention does not dictate (or limit) the detailed inner arrangement of each processor, the formation of the network system which connects the processors or the method for recognizing the idle processors. Hence, it is possible to use a bus, a mesh type network or a network using a multistage router as the present network system. In addition, it is possible to use a network system which accepts the input of information representative of a condition (i.e., an idle or working condition) of each processor. Furthermore, it is possible to externally provide a device which manages the above condition of each processor.

This invention may be practiced in still other ways without departing from the spirit or essential character thereof. For instance, the programming language applied to the present multiprocessor system is not limited by the logic programming language, and it is possible to apply a general programming language to the present multiprocessor system. Therefore, the preferred embodiments described herein are illustrative and not restrictive, the scope of the invention being indicated by the appended claims and all variations which come within the meaning of the claims are intended to be embraced therein.

What is claimed is:

1. A multiprocessor system that executes programs written in a programming language expressed by an inference tree constituted by nodes connected from top to bottom by branches comprising OR processes, said multiprocessor system comprising:
   a plurality of processors numbered serially with identifier numbers and each arranged to perform as a source and as a destination within said multiprocessor system, each of said processors being comprised of:
   (a) first means for generating history information including information extracted from a whole working environment of a respective one of said processors when said respective processor performs as the source, said whole working environment being used for executing the program, the amount of said history information being less than the amount of information representative said whole working environment, said first means generating the history information while said respective processor is processing a specific branch,
   (b) second means for transferring said history information to one of said processors performing as a destination while said respective processor is operating in said multiprocessor system to process the specific branch,
   (c) third means for dynamically reproducing in said respective processor when said respective processor performs as a destination, a whole working environment of one of said processors performing as a source by use of transferred history information from said one of said processors performing as the source, and
   (d) fourth means for processing said specific branch, when said respective processor performs as a destination, by use of the reproduced whole working environment of said one of said processors performing as the source, whereby execution of the programs is shared in said multiprocessor system between said respective processor and said one of said processors performing as a source and said one of processors performing as a destination because of the transferring of said history information and the reproducing of the whole working environment.

2. A multiprocessor system according to claim 1, wherein said history information includes
   (a) depth information representative of an inference depth of said inference tree at which said respective processor is operating when performing as the source, and
   (b) branch information representative of an identifier of the specific branch being processed by said respective processor when performing as the source, which identifier is assigned to said one of said processors performing as a destination, a pair of said depth information and said branch information being generated by said first means every time the specific branch processed by said respective processor performing as the source is shared with said one of said processors performing as a destination.

3. A method useful in a multiprocessor system for sharing execution of programs written in a programming language expressed by an inference tree constituted by nodes connected from top to bottom by branches comprising OR processes, said multiprocessor system having a plurality of processors with separate memories and working environments and being numbered serially with identifier numbers, each of said processors including searching means for searching branches at the node and selecting means for selecting a desirable branch along a given OR process, and a network system linking said processors, said method of load balancing comprising the steps of:

- each of said processors performing as a source and a destination within said multiprocessor system and generating history information in a first processor based on information extracted from a whole working environment of the first processor, said whole working environment being used for executing the program, the amount of history information being less than an amount of information representative of the whole working environment of said first processor, said history information being generated while said first processor processes a specific branch,
- transferring said history information from said first processor to the memory of a second processor while said first processor is operating to process the specific branch,
- dynamically reproducing said whole working environment of said first processor in said second processor by use of said history information transferred from said first processor, and
- processing in said second process a different specific branch by use of the reproduced whole working environment of said first processor, whereby execution of the program is shared between said first and second processors because of the transferring of said history information and the reproducing of the whole working environment.

4. A method according to claim 3, wherein said history information includes
   (a) depth information representative of an inference depth of said inference tree at which said first processor is operating when performing as a source, and
   (b) branch information representative of an identifier of the specific branch being processed by said first processor when performing as a source; and wherein the step of transferring
   further comprises
   dynamically assigning the identifier to said second processor and sharing said specific branch with said second processor, and
   generating a pair of said depth information and said branch information every time said specific branch of said first processor is shared with said second processor.

5. A method according to claim 4, wherein said each processor comprises
   (a) a depth register for storing said depth information,
   (b) a branch register for storing said branch information,
   (c) memory means for storing said depth and branch information and
   (d) operation means for performing an operation based on said depth and branch information stored in said memory means.

* * * * *